United States Patent
Muto (10) Patent No.: US 6,986,337 B2
(45) Date of Patent: Jan. 17, 2006

(54) CONTROL DEVICE OF INTERNAL COMBUSTION ENGINE

(75) Inventor: Harufumi Muto, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/922,102

(22) Filed: Aug. 20, 2004

(65) Prior Publication Data

US 2005/0081823 A1    Apr. 21, 2005

(30) Foreign Application Priority Data

Aug. 26, 2003   (JP) ............................ 2003-301356

(51) Int. Cl.
*F02D 41/18* (2006.01)
*F02D 9/02* (2006.01)
*G01M 15/00* (2006.01)

(52) U.S. Cl. ....................... 123/350; 123/399; 73/118.2
(58) Field of Classification Search ............... 123/350, 123/396, 399, 402, 403; 73/117.3, 118.1, 73/118.2
See application file for complete search history.

(56) References Cited

U.S. PATENT DOCUMENTS

| | | | |
|---|---|---|---|
| 6,199,537 B1 * | 3/2001 | Kowatari et al. ............ | 123/399 |
| 6,497,214 B2 | 12/2002 | Yagi ............................ | 123/399 |
| 6,640,622 B2 * | 11/2003 | Soliman et al. ............. | 73/118.2 |
| 6,662,640 B2 * | 12/2003 | Yagi ............................ | 73/118.2 |
| 6,868,327 B2 * | 3/2005 | Muto .......................... | 701/103 |
| 2002/0078924 A1 | 6/2002 | Yagi ............................ | 123/399 |

FOREIGN PATENT DOCUMENTS

| | | |
|---|---|---|
| JP | A 2001-41095 | 2/2001 |
| JP | A 2002-201998 | 7/2002 |
| JP | 2002-303177 | * 10/2002 |
| JP | A 2002-332884 | 11/2002 |

* cited by examiner

*Primary Examiner*—Hai Huynh
(74) *Attorney, Agent, or Firm*—Oliff & Berridge, PLC (57) ABSTRACT

A control device of an internal combustion engine designed to find a response time constant of a cylinder air filling amount or its equivalent value by a simpler method. The control device comprises means for setting the target opening degree, means for finding a target intake pipe pressure, means for finding a current intake pipe pressure, means for finding a throttle valve air passage flow rate, and means for finding a cylinder intake air flow rate and calculating the response time constant based on the target intake pipe pressure, the current intake pipe pressure, the throttle valve air passage flow rate, and the cylinder intake air flow rate.

6 Claims, 8 Drawing Sheets

CONTROL DEVICE OF INTERNAL COMBUSTION ENGINE

BACKGROUND OF THE INVENTION

1. Field of the Invention

The present invention relates to a control device of an internal combustion engine.

2. Description of the Related Art

As a control device for an internal combustion engine, one has been known which judges a required torque based on an accelerator opening degree etc. and controls operation of a fuel injector or an opening degree of a throttle valve so as to realized this required torque. In general, in such a control device of an internal combustion engine, first a target fuel injection amount and target cylinder air filling amount (or target value of equivalent value of cylinder air filling amount (that is, for example, cylinder intake air flow rate or cylinder air filling rate)) are set based on the required torque, then the operation of the fuel injector and the opening degree of the throttle valve are controlled so that the actual fuel injection amount and cylinder air filling amount (or its equivalent value) matches the target fuel injection amount and target cylinder air filling amount (or target value of equivalent value of cylinder air filling amount).

The cylinder air filling amount (or its equivalent value) is more specifically adjusted by controlling the opening degree of the throttle valve (hereinafter referred to as the "throttle opening degree") to a target opening degree set in accordance with the target cylinder air filling amount (or target value of equivalent value of cylinder air filling amount), but even if making the throttle opening degree the target opening degree, a certain time is required until the actual cylinder air filling amount (or its equivalent value) becomes the target cylinder air filling amount (or target value of equivalent value of the cylinder air filling amount). That is, a change of the cylinder air filling amount (or its equivalent value) occurs with a delay from the change of the throttle opening degree.

Such a delay affects the control of the internal combustion engine, so obtaining a grasp of the extent of the delay is important. As an indicator showing the extent of this delay, the response time constant (63% response time) $\tau$ of the cylinder air filling amount (or its equivalent value) is known. Such a response time constant $\tau$ has previously been found using a map (for example, see Japanese Unexamined Patent Publication (Kokai) No. 2002-332884).

However, to actually prepare a map of the above response time constant $\tau$, a tremendous amount of time is required. That is, to prepare a map, it is necessary to find the response time constant $\tau$ by successively changing arguments such as the engine speed, the operating timings of the intake and exhaust valves, etc. This work is tremendous. Further, due to the increase in the number of maps and arguments required, map search operations increase and the control load ends up increasing.

SUMMARY OF THE INVENTION

An object of the present invention is to provide a control device of an internal combustion engine finding a response time constant $\tau$ of a cylinder air filling amount or its equivalent value by a simpler method.

To attain the above object, there is provided a control device of an internal combustion engine calculating a response time constant of a cylinder air filling amount or its equivalent value when an opening degree of a throttle valve is changed to a target opening degree, provided with means for setting the target opening degree, means for finding a target intake pipe pressure as a value of convergence of an intake pipe pressure at a downstream side of the throttle valve when maintaining the opening degree of the throttle valve at the target opening degree, means for finding a current intake pipe pressure as an intake pipe pressure at a downstream side of the throttle valve when changing the opening degree of the throttle valve to the target opening degree, means for finding a throttle valve air passage flow rate, and means for finding a cylinder intake air flow rate and calculating the response time constant based on the target intake pipe pressure, the current intake pipe pressure, the throttle valve air passage flow rate, and the cylinder intake air flow rate.

The response time constant of the cylinder air filling amount or its equivalent value when the opening degree of the throttle valve is changed to the target opening degree has previously been found using a map, but the work for preparing the map is tremendous. Further, the control load at the time of a map search is also large.

As opposed to this, in one aspect of the present invention, the response time constant of the cylinder air filling amount or its equivalent value is found by calculation based on the target intake pipe pressure, the current intake pipe pressure, the throttle valve air passage flow rate, and the cylinder intake air flow rate. Therefore, the response time constant of the cylinder air filling amount or its equivalent value can be found more simply.

Preferably, the response time constant is calculated using the following equation (1) where $\tau$ is the response time constant, Pmta is the target intake pipe pressure, Pm0 is the current intake pipe pressure, mt0 is a throttle valve air passage flow rate when changing the opening degree of the throttle valve to the target opening degree, mc0 is a cylinder intake air flow rate when changing the opening degree of the throttle valve to the target opening degree, Vm is a volume of an intake pipe part from the throttle valve to the intake valve, Tm0 is the intake pipe temperature at the downstream side of the throttle valve when changing the opening degree of the throttle valve to the target opening degree, and R is the gas constant:

$$\tau = \frac{Pmta - Pm0}{mt0 - mc0} \cdot \frac{Vm}{R \cdot Tm0} \tag{1}$$

Due to this, the response time constant of the cylinder air filling amount or its equivalent value can be found by simple calculation.

More preferably, the means for setting the target opening degree of the throttle valve has means for finding a cylinder air filling amount corresponding to the required torque or its equivalent value and finding a required intake pipe pressure as the intake pipe pressure at the downstream side of the throttle valve for realizing this and, when the required intake pipe pressure is larger than a predetermined pressure, finding an opening degree of the throttle valve for realizing the predetermined pressure as a corrected target opening degree and setting the corrected target opening degree as the target opening degree.

In general, the effect of the change in opening degree of the throttle value on the cylinder air filling amount or the intake pipe pressure at the downstream side of the throttle valve becomes extremely small in the region where the throttle valve opening degree is large, that is, the region where the intake pipe pressure at the downstream side of the throttle valve is large. Therefore, in the region where the throttle valve opening degree is large, that is, in the region where the intake pipe pressure at the downstream side of the throttle valve is large, even if the required torque changes slightly and the cylinder air filling amount or its equivalent value corresponding to this changes slightly, to realize a change of the required intake pipe pressure corresponding to this, the opening degree of the throttle valve fluctuates largely. Sometimes there is hunting of the opening degree of the throttle valve.

As opposed to this, in the above-mentioned aspect of the present invention, when the required intake pipe pressure is larger than the predetermined pressure, the opening degree of the throttle valve for realizing the predetermined pressure is found as the corrected target opening degree and the corrected target opening degree is set as the target opening degree, so by suitably setting the predetermined pressure, it is possible to suppress hunting of the throttle valve opening degree.

Alternatively, the means for setting the target opening degree of the throttle valve has means for finding a cylinder air filling amount corresponding to the required torque or its equivalent value and finding a required intake pipe pressure as the intake pipe pressure at the downstream side of the throttle valve for realizing this and, when the required intake pipe pressure is larger than a predetermined pressure, finding an opening degree of the throttle valve for realizing the predetermined pressure as a corrected target opening degree and setting the corrected target opening degree plus a correction value determined based on at least an engine speed as the target opening degree.

Due to this, by suitably setting the correction value, for example, corresponding to the tolerance of the throttle opening degree sensor or deposits on the throttle valve, it is possible to prevent the target opening degree from being set excessively small.

More preferably, when there is a request for setting the opening degree of the throttle valve for realizing the required intake pipe pressure as the target opening degree when the required intake pipe pressure is larger than a predetermined pressure, the opening degree of the throttle valve for realizing the required intake pipe pressure is set as the target opening degree.

Due to this, in accordance with need, it is possible to realize control giving priority to an operation meeting with the requests more than suppressing hunting.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Preferred embodiments of the present invention will be described in detail below while referring to the attached figures. Note that in the figures, the same or similar components are assigned the same reference numerals.

Figure 1:
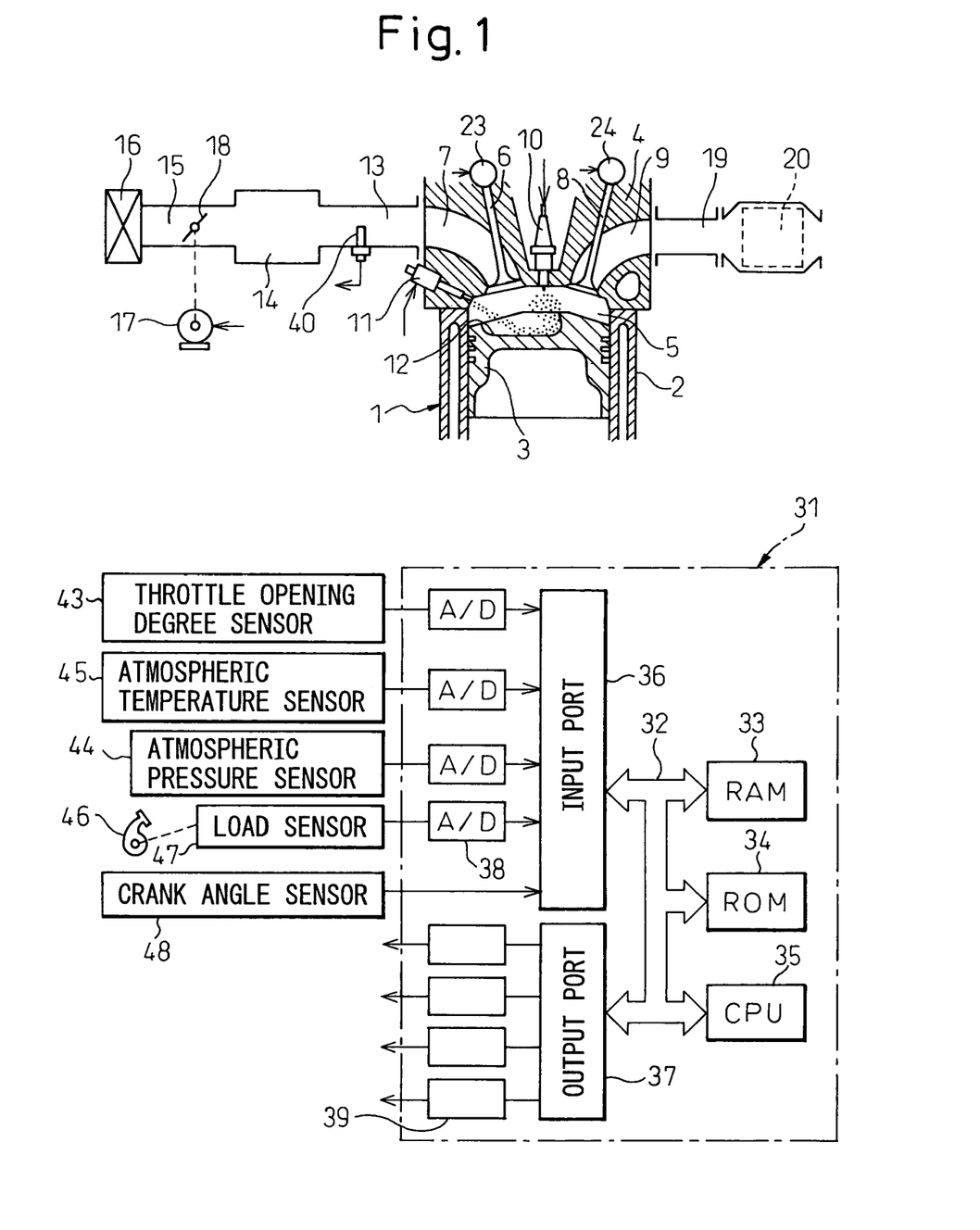
FIG. 1 is a schematic view of an example of the case of application of the control device of an internal combustion engine of the present invention to a cylinder injection type spark ignition internal combustion engine.

FIG. 1 is a schematic view of an example of the case of application of the control device of the internal combustion engine of the present invention to a cylinder injection type spark ignition internal combustion engine. Note that the present invention may also be applied to another spark ignition internal combustion engine or a compression ignition internal combustion engine.

As shown in FIG. 1, the engine body 1 is provided with a cylinder block 2, a piston 3 moving reciprocally inside the cylinder block 2, and a cylinder head 4 fixed on the cylinder block 2. Each piston 3 and the cylinder head 4 have a combustion chamber 5 formed between them. The cylinder head 4 has an intake valve 6, intake port 7, exhaust valve 8, and exhaust port 9 arranged for each cylinder. The intake valve 6 and exhaust valve 8 are provided with variable valve timing mechanisms 23 and 24 for changing the operating timings of the valves. Further, as shown in FIG. 1, a spark plug 10 is arranged at the center of the inside wall of the cylinder head 4 and a fuel injector 11 is arranged at a peripheral portion of the inside wall of the cylinder head 4. Further, the top surface of the piston 3 is formed with a cavity 12 extending from below the fuel injector 11 to below the spark plug 10.

The intake port 7 of each cylinder is connected with a surge tank 14 through the downstream side intake pipe 13. The surge tank 14 is connected with an air cleaner 16 through the upstream side intake pipe 15. The intake pipe 15 has a throttle valve 18 driven by a step motor 17 arranged in it. On the other hand, the exhaust port 9 of each cylinder is connected with an exhaust pipe 19. This exhaust pipe 19 is connected to an exhaust purification device 20.

An electronic control unit (ECU) 31 is comprised of a digital computer comprising a random access memory (RAM) 33, a read only memory (ROM) 34, a microprocessor (CPU) 35, an input port 36, and an output port 37 connected with each other through a two-way bus 32. The intake pipe 13 is provided with an intake pipe pressure sensor 40 for detecting a pressure inside the intake pipe at the downstream side from the throttle valve 18. The intake pipe pressure sensor 40 generates an output voltage proportional to the intake pipe pressure. The output voltage is input to the input port 36 through a corresponding A/D converter 38.

Further, a throttle opening degree sensor 43 for detecting an opening degree of the throttle valve 18, an atmospheric pressure sensor 44 for detecting the pressure of the atmosphere around the internal combustion engine or the pressure of the air taken into the intake pipe 15 (intake pressure), and an atmospheric temperature sensor 45 for detecting the temperature of the atmosphere around the internal combustion engine or the temperature of the air taken into the intake pipe 15 (intake temperature) are provided. The output voltages of these sensors are input through the corresponding AD converters 38 to the input port 36.

Further, the accelerator pedal 46 has a load sensor 47 for generating an output voltage proportional to the amount of depression of the accelerator pedal 46 (hereinafter referred to as the "amount of accelerator depression") connected to it. The output voltage of the load sensor 47 is input through the corresponding AD converter 38 to the input port 36. A crank angle sensor 48 generates an output pulse each time for example the crankshaft rotates 30 degrees. This output pulse is input to the input port 36. The CPU 35 calculates the engine speed from the output pulses of the crank angle sensor 48. On the other hand, the output port 37 is connected through the corresponding drive circuits 39 to the spark plugs 10, fuel injectors 11, step motor 17, etc. Further, the variable valve timing mechanisms 23 and 24 are also controlled by the ECU 31.

However, in recent years, models of the intake system of internal combustion engines have been created based on fluid dynamics etc. Control devices for internal combustion engines for controlling internal combustion engines based on control parameters calculated using these models are being studied. That is, for example, throttle models, intake pipe models, intake valve models, etc. have been constructed for the intake systems of internal combustion engines, these models have been used to calculate the parameters required for various types of control, and internal combustion engines have been controlled based on these.

In this embodiment as well, in the configuration shown in FIG. 1, the internal combustion engine is controlled using such models. In the present embodiment, a model of the intake system is created based on a throttle model M21, intake pipe model M22, and intake valve model M23. The control device of the internal combustion engine is provided with equations showing these models explained below.

Figure 2:
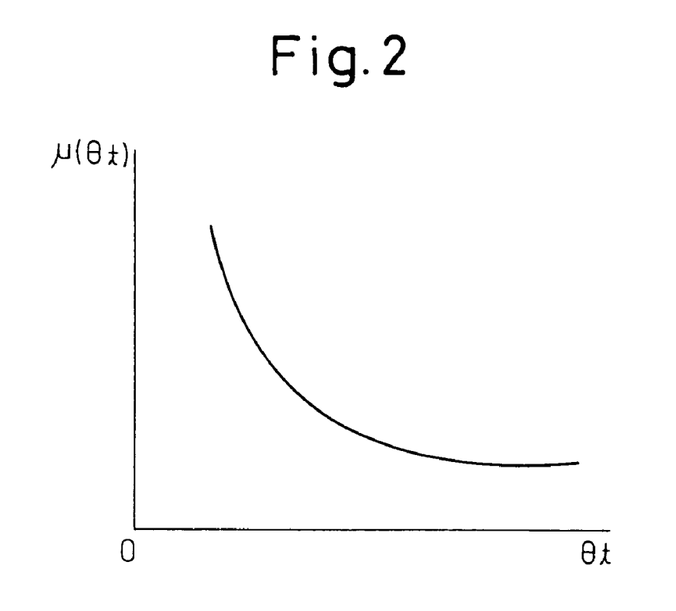
FIG. 2 is a view of the relationship of a throttle valve opening degree and flow coefficient.

Below, the models M21 to M23 will be explained. First, the throttle model M21 will be explained. The throttle model M21 is a model of a throttle valve. According to this, the throttle valve air passage flow rate mt (g/s) is expressed by the following equation (2). Here, Pa (kPa) is the atmospheric pressure, Ta (K) is the atmospheric temperature, Pm (kPa) is the pressure inside the intake pipe at the downstream side from the throttle valve (hereinafter called the "downstream side intake pipe pressure"), and R is the gas constant. Further, $\mu$ is the flow coefficient in a throttle valve, is a function of the throttle valve opening degree θt, and is determined from a map as shown in FIG. 2. Further, At (m²) indicates the cross-sectional area of the opening of the throttle valve (hereinafter referred to as the "throttle opening area") and is a function of the throttle valve opening degree θt. Note that if making $\mu$·At combining the flow coefficient $\mu$ and the throttle opening area At a function F(θt) having just the throttle valve opening degree θt as a variable, equation (2) can be rewritten to equation (3):

$$mt = \mu \cdot At \cdot \frac{Pa}{\sqrt{R \cdot Ta}} \cdot \Phi\left[\frac{Pm}{Pa}\right] \quad (2)$$

$$mt = F(\theta t) \cdot \frac{Pa}{\sqrt{R \cdot Ta}} \cdot \Phi\left[\frac{Pm}{Pa}\right] \quad (3)$$

Figure 3:
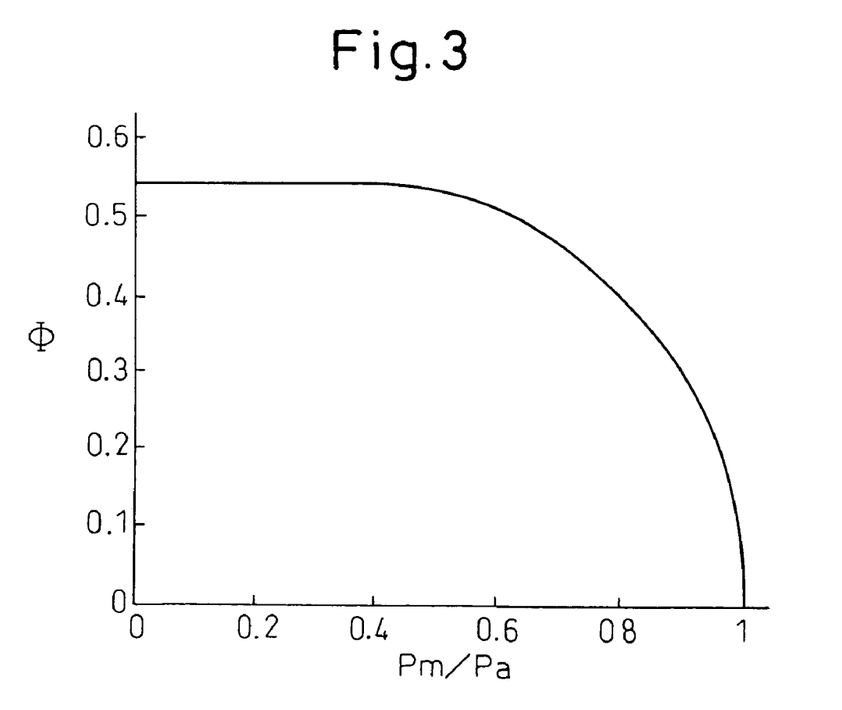
FIG. 3 is a view of the function $\Phi$ (Pm/Pa)

Φ (Pm/Pa) is a function shown in the following equation (4). The κ in equation (4) is the ratio of specific heat (κ=Cp (constant pressure specific heat)/Cv (constant volume specific heat), made a constant value). This function Φ (Pm/Pa) can be expressed as a graph such as shown in FIG. 3, so it is possible to store this graph in the ROM of the ECU as a map and not use equation (4) for calculation, but find the value of Φ (Pm/Pa) from the map.

$$\Phi\left[\frac{Pm}{Pa}\right] = \begin{cases} \sqrt{\frac{\kappa}{2(\kappa+1)}} & \cdots \frac{Pm}{Pa} \leq \frac{1}{\kappa+1} \\ \sqrt{\left\{\left(\frac{\kappa-1}{2\kappa}\right) \cdot \left(1 - \frac{Pm}{Pa}\right) + \frac{Pm}{Pa}\right\} \cdot \left(1 - \frac{Pm}{Pa}\right)} & \cdots \frac{Pm}{Pa} > \frac{1}{\kappa+1} \end{cases} \quad (4)$$

Figure 4:
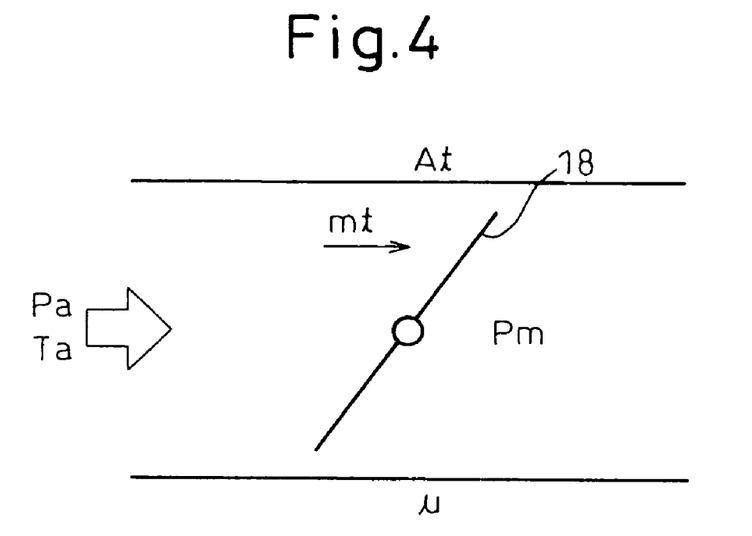
FIG. 4 is a view of the basic concept of a throttle model.

Equation (2) to equation (4) of the throttle model M21 are obtained by making the pressure of the gas upstream of the throttle valve 18 the atmospheric pressure Pa, making the temperature of the gas upstream of the throttle valve 18 the atmospheric temperature Ta, and making the pressure of the gas passing through the throttle valve 18 the downstream side intake pipe pressure Pm, applying the law of the conservation of mass, the law of the conservation of energy, and the law of the conservation of motion to the model of the throttle valve 18 as shown in FIG. 4, and utilizing the gas state equation, definition of the ratio of specific heat, and Mayer's formula.

Next, the intake pipe model M22 will be explained. The intake pipe model M22 is a model of the part 13' of the intake pipe etc. from the throttle valve to the intake valve (hereinafter called the "intake pipe part"). According to this, the downstream side intake pipe pressure Pm (kPa) and the downstream side intake pipe temperature Tm (K) can be expressed as shown in the following equation (5) and equation (6). Here, mc (g/s) is the cylinder intake air flow rate and Vm (m³) is a constant equal to the volume of the intake pipe part 13'.

$$\frac{d}{dt}\left(\frac{Pm}{Tm}\right) = \frac{R}{Vm} \cdot (mt - mc) \quad (5)$$

$$\frac{dPm}{dt} = \kappa \cdot \frac{R}{Vm} \cdot (mt \cdot Ta - mc \cdot Tm) \quad (6)$$

Figure 5:
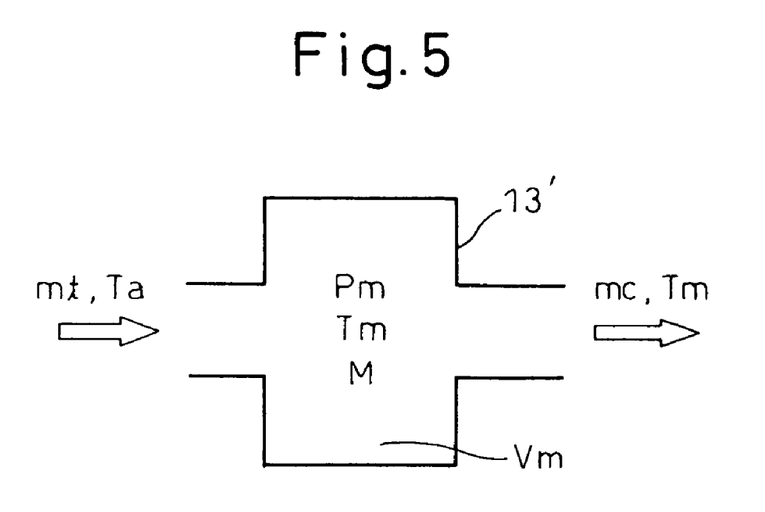
FIG. 5 is a view of the basic concept of an intake pipe model.

Here, the intake pipe model M22 will be explained with reference to FIG. 5. If the total gas amount (mass) in the intake pipe part 13' is made M, the change over time of the total gas amount volume M becomes equal to the difference between the flow rate of the gas flowing into the intake pipe part 13', that is, the throttle valve air passage flow rate mt, and the flow rate of the gas flowing out of the intake pipe part 13', that is, the cylinder intake air flow rate mc, so due to the law of the conservation of mass, equation (7) is obtained. From this equation (7) and the gas state equation (Pm·Vm=M·R·Tm), equation (5) is obtained:

$$\frac{dM}{dt} = mt - mc \qquad (7)$$

Further, the change over time of the energy of gas M·Cv·Tm of the intake pipe part 13' is equal to the difference between the energy of the gas flowing into the intake pipe part 13' and the energy of the gas flowing out from the intake pipe part 13'. Therefore, if making the temperature of the gas flowing into the intake pipe part 13' the atmospheric temperature Ta and making the temperature of the gas flowing out from the intake pipe part 13' the downstream side intake pipe temperature Tm, the following equation (8) is obtained from the law of the conservation of energy and equation (6) is obtained from equation (8) and the gas state equation:

$$\frac{d(M \cdot Cv \cdot Tm)}{dt} = Cp \cdot mt \cdot Ta - Cp \cdot mc \cdot Tm \qquad (8)$$

Finally, the intake valve model M23 will be explained. The intake valve model M23 is a model of the intake valve. According to this, the cylinder intake air flow rate mc is expressed by equation (9). a and b in equation (9) are compliance parameters determined based on at least the engine speed NE. A map is prepared in advance and the map is searched to find them in accordance with need. Note that in the present embodiment, the intake and exhaust valves are provided with variable valve timing mechanisms 23 and 24. Since the operating timings of the intake and exhaust valves can be changed, the compliance parameters a and b are determined based on the phase angles expressing the operating timings of the intake and exhaust valves.

$$mc = a \cdot Pm - b \qquad (9)$$

Figure 6:
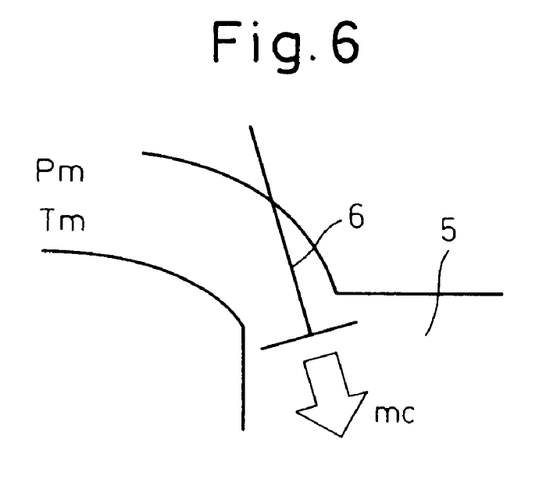
FIG. 6 is a view of the basic concept of an intake valve model.

The above-mentioned intake valve model M23 will be explained next referring to FIG. 6. In general, the cylinder air filling amount Mc showing the amount of air filled into the combustion chamber 5 at the time the intake valve 6 is closed is finally set at the time the intake valve 6 is closed (when intake valve is closed) and is proportional to the pressure in the combustion chamber 5 at the time the intake valve is closed. Further, the pressure inside the combustion chamber 5 at the time the intake valve is closed can be deemed as equal to the pressure of the gas upstream of the intake valve, that is, the downstream side intake pipe pressure Pm. Therefore, the cylinder air filling amount Mc can be approximated as being proportional to the downstream side intake pipe pressure Pm.

Here, if making the average of the total amounts of air flowing out from the intake pipe part 13' per unit time or the average of the amounts of air flowing from the intake pipe part 13' to all combustion chambers 5 per unit time across the intake stroke of one cylinder the cylinder intake air flow rate mc (explained in detail below), since the cylinder air filling amount Mc is proportional to the downstream side intake pipe pressure Pm, the cylinder intake air flow rate mc can also be considered to be proportional to the downstream side intake pipe pressure Pm. From this, the above equation (9) is obtained theoretically and empirically. Note that the compliance parameter a in equation (9) is a proportional coefficient. The compliance parameter b is a value relating to the amount of burned gas remaining in a combustion chamber 5 at the time of the exhaust valve is closed (explained later).

Note that regarding the compliance parameters a and b, by setting two different values (for example, a1, b1 and a2, b2) when the downstream side intake pipe pressure Pm is large and when it is small even if the engine speed etc. are the same, that is, by expressing the cylinder intake air flow rate mc by two equations such as shown in equation (9) (that is, primary equation of downstream side intake pipe pressure Pm), it is learned that sometimes it is possible to find the cylinder intake air flow rate mc more accurately. This is considered to be related to the fact that the burned gas flows backward to the intake port 7 when there is a period when both of the intake valve 6 and the exhaust valve 8 are opened (that is, valve overlap). That is, when there is valve overlap, when the downstream side intake pipe pressure Pm is more than a predetermined pressure, the higher the downstream side intake pipe pressure Pm, the more remarkable the decline in the backflow of the burned gas, so compared with when the pressure is less than the predetermined pressure, the value of a is made larger and the value of b is made smaller.

Figure 7:
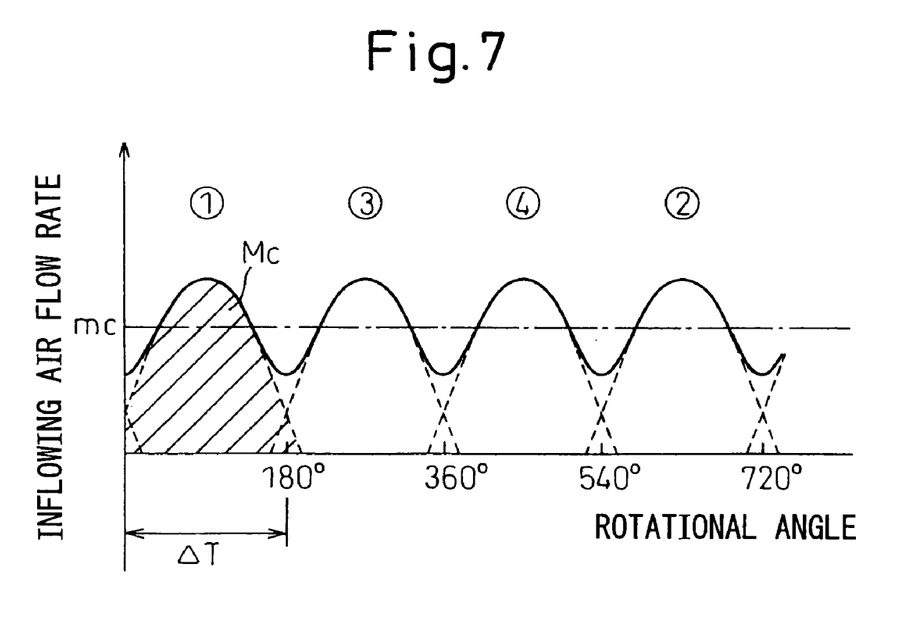
FIG. 7 is a view relating to the definitions of the cylinder air filling amount and cylinder intake air flow rate.

Here, the cylinder intake air flow rate mc will be explained with reference to FIG. 7 for the case where the internal combustion engine has four cylinders. Note that in FIG. 7, the abscissa is the rotational angle of the crankshaft, while the ordinate is the inflowing airflow rate, i.e., the amount of air actually flowing from the intake pipe part 13' to the combustion chamber 5 per unit time. As shown in FIG. 7, in a four-cylinder internal combustion engine, the intake valve 6 for example opens in the order of the #1 cylinder, #3 cylinder, #4 cylinder, and #2 cylinder. Air flows from the intake pipe part 13' to the combustion chamber 5 of each cylinder in accordance with the amount of opening of the intake valve 6 corresponding to each cylinder. The change in the flow rate of the air flowing from the intake pipe part 13' into the combustion chamber 5 of each cylinder is as shown by the broken line in FIG. 7. The flow rate of the air flowing from the intake pipe part 13' into the combustion chambers 5 of all cylinders combining these is as shown by the solid line in FIG. 7. Further, the cylinder air filling amount Mc to the #1 cylinder corresponds to the part shown by hatching in FIG. 7.

As opposed to this, the average of the flow rates of air flowing from the intake pipe part 13' into the combustion chambers 5 of all of the cylinders shown by the solid line is the cylinder intake air flow rate mc and is shown by the dot-chain line in the figure. Further, the cylinder intake air flow rate mc shown by the dot-chain line multiplied with the time $\Delta T_{180°}$ required for the crankshaft to rotate 180° in the case of four cylinders (that is, in a four-stroke type internal combustion engine, the angle 720° of rotation of the crankshaft in one cycle divided by the number of cylinders) becomes the cylinder air filling amount Mc. Therefore, by multiplying the cylinder intake air flow rate mc calculated by the intake valve model M23 with $\Delta T_{180°}$, it is possible to calculate the cylinder air filling amount Mc (Mc=mc·$\Delta T_{180°}$). Further, by dividing the cylinder air filling amount Mc by the mass of the air occupying a volume corresponding to the displacement per cylinder in the state of 1 atm and 25° C., it is possible to calculate the cylinder air filling rate K1. In this way, the cylinder air filling amount Mc, the cylinder intake air flow rate mc, and the cylinder air filling rate K1 are in proportional relationships with each other. If finding the value of one, it is possible to find the values of the others. In this sense, the cylinder intake air flow rate mc and the cylinder air filling rate K1 can be said to be equivalent values of the cylinder air filling amount Mc, i.e., values corresponding to the cylinder air filling amount Mc. Note that as clear from the above explanation, if multiplying the value b in equation (9) with $\Delta T_{180°}$, the amount of burned gas remaining in a combustion chamber 5 when the exhaust valve 8 is closed can be considered to be obtained.

However, in the present embodiment, normally the internal combustion engine is controlled as follows. That is, first, the required torque TQr is found based on the amount of accelerator depression, the engine speed, the shift position, and other operating conditions. Here, the required torque TQr is found based on a map prepared in advance linking required torques TQr with various operating conditions (that is, a map having, for example, the amount of accelerator depression, engine speed, shift position, etc. as arguments).

Next, the required cylinder air filling amount Mcr is found based on the required torque TQr. The required cylinder air filling amount Mcr is converted to the required cylinder intake air flow rate mcr, and the required intake pipe pressure Pmr comprised of the intake pipe pressure at the downstream side of the throttle valve for realizing the required cylinder intake air flow rate mcr is found using equation (9). That is, the required intake pipe pressure Pmr can be expressed by equation (10):

$$Pmr = \frac{mcr - b}{a} \quad (10)$$

Next, equation (2) or equation (3) is used to find the required throttle opening degree θtr as the opening degree of the throttle valve for realizing the required intake pipe pressure Pmr. That is, at the time of steady state operation, the throttle valve air passage flow rate and the cylinder intake air flow rate match, so equation (11) stands. Further, by finding the throttle opening degree satisfying equation (11), it is possible to find the required throttle opening degree θtr. Note that as clear from the above explanation, the required intake pipe pressure Pmr is the value of convergence of the intake pipe pressure at the downstream side of the throttle valve when maintaining the throttle opening degree at the required throttle opening degree θtr:

$$mcr = F(\theta tr) \cdot \frac{Pa}{\sqrt{R \cdot Ta}} \cdot \Phi\left(\frac{Pmr}{Pa}\right) \quad (11)$$

Further, in the present embodiment, the required throttle opening degree θtr is set as it is as the target opening degree θtta (therefore, in the present embodiment, the required intake pipe pressure Pmr, the required cylinder intake air flow rate mcr, and the required cylinder air filling amount Mcr also become as they are the target intake pipe pressure Pmta, the target cylinder intake air flow rate mcta, and the target cylinder air filling amount Mcta). Further, the throttle valve 18 (that is, the step motor 17) is controlled so that the actual throttle opening degree becomes the target opening degree θtta, and the required cylinder air filling amount Mcr (that is, the target cylinder air filling amount Mcta) is realized.

Note that in the control of the fuel injection amount, the target fuel injection amount FUta is set in accordance with the target cylinder air filling amount Mcta designed to be realized in the above way. The operation of the fuel injector 11 is controlled so that the actual fuel injection amount matches the target fuel injection amount FUta.

However, the control of the cylinder air filling amount Mc in the present embodiment (or its equivalent values mc or K1) is realized by control of the throttle opening degree θt as explained above, but in actuality, even if the throttle opening degree θt is made the target opening degree θtta, a certain time is taken until the cylinder air filling amount Mc (or its equivalent values mc or K1) becomes the target cylinder air filling amount Mcta (or the target value of the equivalent value mc or K1, that is, the target cylinder intake air flow rate mcta or target cylinder air filling rate K1ta). That is, the change in the cylinder air filling amount Mc (or its equivalent value mc or K1) has a delay from the change of the throttle opening degree θt.

Figure 8:
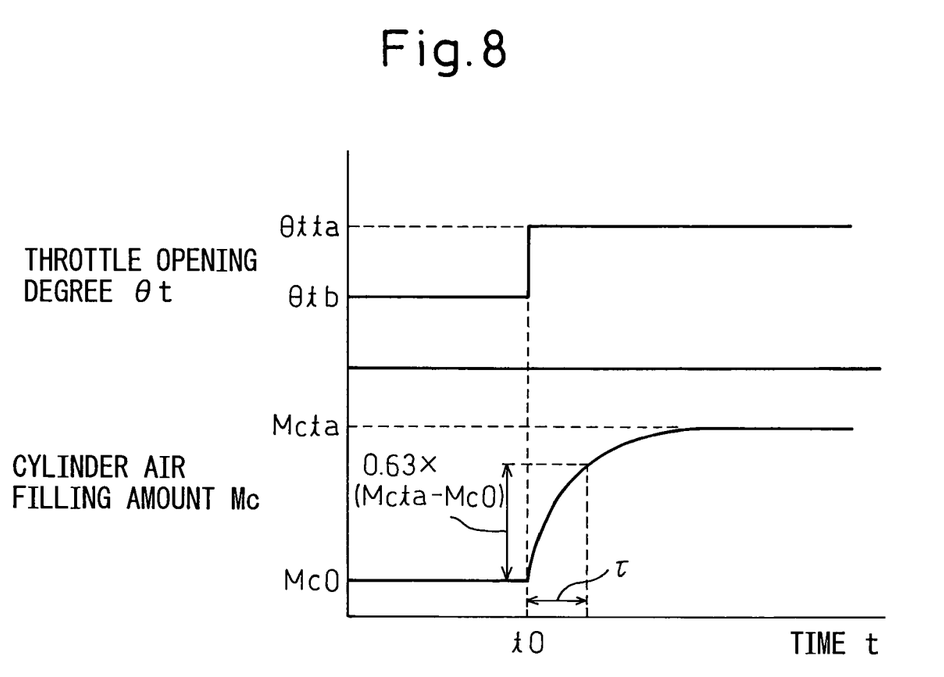
FIG. 8 is a view for explaining the response time constant (63% response time) $\tau$ taking as an example the change of the cylinder air filling amount Mc with respect to the change of the throttle valve opening degree $\theta t$.

This delay affects the control of the internal combustion engine, so obtaining a grasp of the extent of the delay is important. As an indicator showing the extent of this delay, the response time constant (63% response time) τ of the cylinder air filling amount Mc (or its equivalent value mc or K1) is known. FIG. 8 is a view for showing the response time constant τ taking as an example the change of the cylinder air filling amount Mc. In FIG. 8, θtb is the throttle opening degree before change, θtta is the throttle opening degree after change (that is, the target opening degree), and t0 is the time of change of the throttle opening degree. Further, Mc0 is the cylinder air filling amount when changing the throttle opening degree, and Mcta is the cylinder air filling amount converging when changing the throttle opening degree to the target opening degree θtta (that is, the target cylinder air filling amount).

Further, this response time constant τ has previously been found using a map. However, tremendous time is required for actually preparing a map of the response time constant τ. That is, to prepare a map, it is necessary to find the response time constant τ while successively changing the engine speed, the opening timings of the intake and exhaust valves, and other arguments. This work is tremendous. Further, there is the concern that due to the increase in the necessary number of maps or arguments, the map search operations will increase and the control load will increase.

Therefore, in the control device of an internal combustion engine of the present embodiment, the response time constant τ is found by calculation by the method explained below. Note that as explained above, the cylinder air filling amount Mc, the cylinder intake air flow rate mc, and the cylinder air filling rate K1 are in proportional relations with each other, so the response time constant τ for any of these values becomes the same and can be found by the following method. That is, in the present embodiment, if considering the change over time of the total gas amount M of the intake pipe part 13', equation (12) is obtained from equation (7) and equation (3), equation (9), etc.

$$\frac{dM(t)}{dt} = mt(t) - mc(t) \quad (12)$$
$$= F(\theta t(t)) \cdot \frac{Pa}{\sqrt{R \cdot Ta}} \cdot \Phi\left(\frac{Pm(t)}{Pa}\right) - (a \cdot Pm(t) - b)$$

Further, the following equation (13) is obtained from equation (12) and the gas state equation $$\frac{dPm(t)}{dt} = \frac{dM(t)}{dt} \cdot \frac{R \cdot Tm(t)}{Vm} \quad (13)$$

$$= (mt(t) - mc(t)) \cdot \frac{R \cdot Tm(t)}{Vm}$$

$$= \left\{ F(\theta t(t)) \cdot \frac{Pa}{\sqrt{R \cdot Ta}} \cdot \Phi\left(\frac{Pm(t)}{Pa}\right) - (a \cdot Pm(t) - b) \right\} \cdot \frac{R \cdot Tm(t)}{Vm}$$

Here, if considering the fact that the downstream side intake pipe pressure Pm is in a proportional relation with the cylinder intake air flow rate mc, the response time constant τ to be found becomes equal to the response time constant (63% response time) when the downstream side intake pipe pressure Pm changes from the value Pm0 (start point) when changing the throttle opening degree θt to the target opening degree θtta (hereinafter called the "current intake pipe pressure") to the target intake pipe pressure Pmta (convergence point). Further, this value can be obtained by finding the response time constant τ satisfying equation (14) obtained from equation (13) if making the time when changing the throttle opening degree θt to the target opening degree θtta (more specifically, when finishing changing the throttle opening degree θt to the target opening degree θtta) t0. Note that here Pm0=Pm(t0).

$$0.63(Pmta - Pm0) = \int_{t0}^{t0+\tau} \frac{dPm(t)}{dt} dt \quad (14)$$

$$= \int_{t0}^{t0+\tau} (mt(t) - mc(t)) \cdot \frac{R \cdot Tm(t)}{Vm} dt$$

$$= \int_{t0}^{t0+\tau} \left[ \left\{ F(\theta t(t)) \cdot \frac{Pa}{\sqrt{R \cdot Ta}} \cdot \Phi\left(\frac{Pm(t)}{Pa}\right) - (a \cdot Pm(t) - b) \right\} \cdot \frac{R \cdot Tm(t)}{Vm} \right] dt$$

Further, finding the response time constant τ satisfying equation (14) is synonymous with finding nΔt when the cumulative value of pressure change ΔPm for each discrete time Δt calculated by equation (15) obtained using the discrete time as Δt from equation (13) becomes 0.63 (Pmta−Pm0).

$$\left. \begin{aligned} \Delta Pm(t0 + \Delta t) &= Pm(t0 + \Delta t) - Pm(t0) \\ &= \Delta t \cdot (mt(t0 + \Delta t) - mc(t0 + \Delta t)) \cdot \frac{R \cdot Tm(t0 + \Delta t)}{Vm} \\ \Delta Pm(t0 + 2\Delta t) &= Pm(t0 + 2\Delta t) - Pm(t0 + \Delta t) \\ &= \Delta t \cdot (mt(t0 + 2\Delta t) - mc(t0 + 2\Delta t)) \cdot \frac{R \cdot Tm(t0 + 2\Delta t)}{Vm} \\ &\vdots \\ \Delta Pm(t0 + n\Delta t) &= Pm(t0 + n\Delta t) - Pm(t0 + (n-1)\Delta t) \\ &= \Delta t (mt(t0 + n\Delta t) - mc(t0 + n\Delta t)) \cdot \frac{R \cdot Tm(t0 + n\Delta t)}{Vm} \end{aligned} \right\} \quad (15)$$

That is, by finding n satisfying equation (16) and then multiplying the n by the discrete time Δt, it is possible to obtain the response time constant τ (=nΔt).

$$\sum_{i=1}^{n} \Delta Pm(t0 + i\Delta t) = 0.63(Pmta - Pm0) \quad (16)$$

Figure 9:
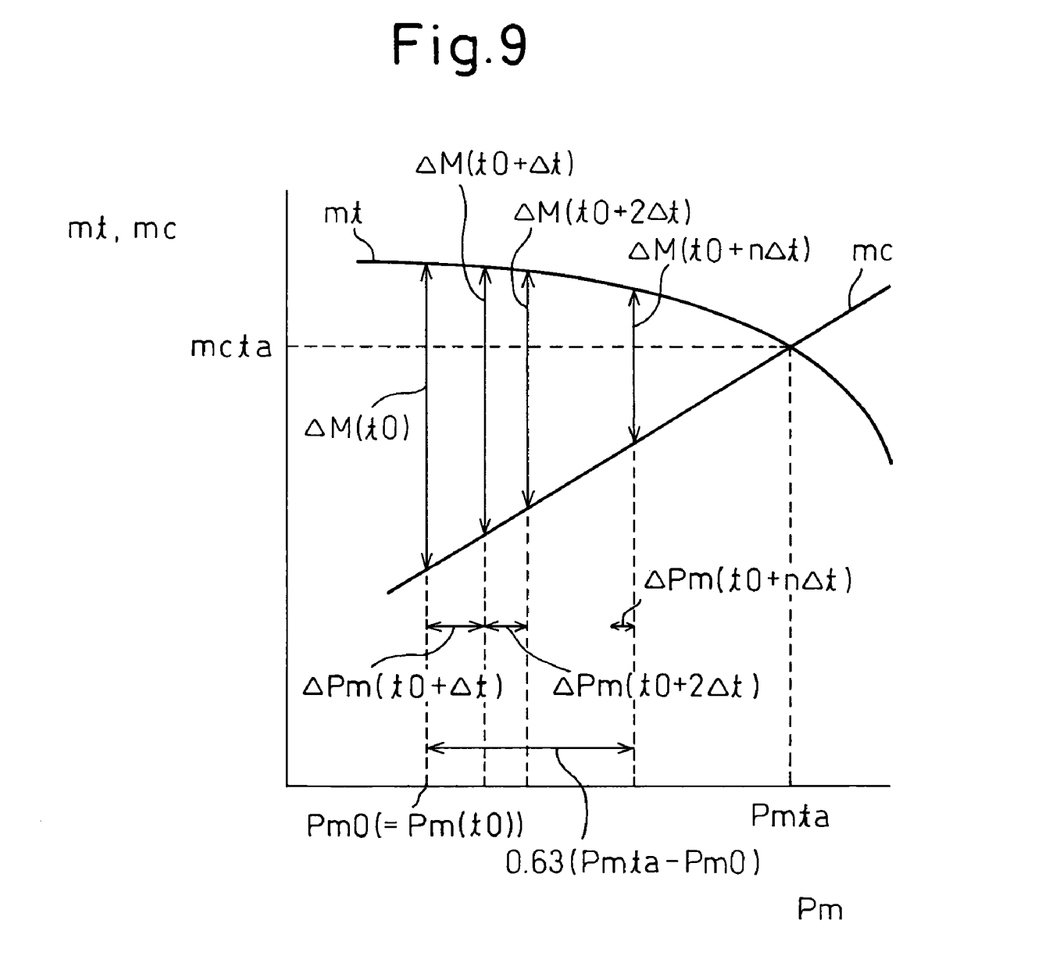
FIG. 9 is a view of the method of calculation of a response time constant $\tau$.

FIG. 9 is a view of the process of calculation of the response time constant τ by equation (15) or equation (16) replacing the part of mt(t)−mc(t) of equation (15) with ΔM(t). The ordinate shows the throttle valve air passage flow rate mt and the cylinder intake air flow rate mc, while the abscissa shows the downstream side intake pipe pressure Pm. In the figure, the curve shown by mt is the curve expressed by equation (2) or equation (3), while the line expressed by mc is the line expressed by equation (9).

Note that when trying to find the response time constant τ by the above method, in actuality, sometimes, the cumulative value of the pressure change ΔP (that is, the value at the left side of equation (16)) does not match with 0.63 (Pmta−Pm0). Therefore, more specifically, the n when the cumulative value of the pressure change ΔP becomes more than 0.63 (Pmta−Pm0) is found. Then, the value obtained by multiplying the n by the discrete time Δt is found as the response time constant τ. Further, in this method, the calculation can be facilitated by making the atmospheric pressure Pa and the atmospheric temperature Ta constant and also by assuming that the downstream side intake pipe temperature Tm(t) is constant.

The response time constant τ can be found by the above method, but it is also possible to find it more simply using the method described next. According to this method, it is possible to avoid repeated calculations of equation (15).

That is, by considering the response delay of the downstream side intake pipe pressure Pm, the downstream side intake pipe pressure Pm (t0+Δt) after Δt from the reference time t0 (current) can be expressed by equation (17) using the response time constant τ:

$$Pm(t0 + \Delta t) = Pm(t0) + \Delta Pm(t0 + \Delta t) \quad (17)$$

$$= Pm(t0) + (1 - e^{-\frac{\Delta t}{\tau}})(Pmta - Pm0)$$

Here, if Δt<<τ, equation (17) can be rewritten as equation (18):

$$Pm(t0 + \Delta t) = Pm(t0) + \Delta Pm(t0 + \Delta t) \quad (18)$$

$$= Pm(t0) + \frac{\Delta t}{\tau}(Pmta - Pm0)$$

Further, from equation (18), equation (19) is obtained.

$$\tau = \frac{\Delta t}{\Delta Pm(t0)}(Pmta - Pm0) \quad (19)$$

Further, if equation (19) is further rewritten using equation (13), the result becomes equation (20). By using equation (20), it is possible to find the response time constant τ more simply. Note that equation (20) becomes equation (21) if rewriting mt(t0)=mt0, mc(t0)=mc0, Tm(t0)=Tm0, θt(t0)=θtta, Pm(t0)=Pm0:

$$\tau = \frac{Pmta - Pm0}{(mt(t0) - mc(t0))} \cdot \frac{Vm}{R \cdot Tm(t0)} \quad (20)$$

$$= \frac{Pmta - Pm0}{\left\{ F(\theta t(t0)) \cdot \frac{Pa}{\sqrt{R \cdot Ta}} \cdot \Phi\left(\frac{Pm(t0)}{Pa}\right) - (a \cdot Pm(t0) - b) \right\}} \cdot \frac{Vm}{R \cdot Tm(t0)}$$

$$\tau = \frac{Pmta - Pm0}{(mt0 - mc0)} \cdot \frac{Vm}{R \cdot Tm0} \quad (21)$$

$$= \frac{Pmta - Pm0}{\left\{ F(\theta tta) \cdot \frac{Pa}{\sqrt{R \cdot Ta}} \cdot \Phi\left(\frac{Pm0}{Pa}\right) - (a \cdot Pm0 - b) \right\}} \cdot \frac{Vm}{R \cdot Tm0}$$

Figure 10:
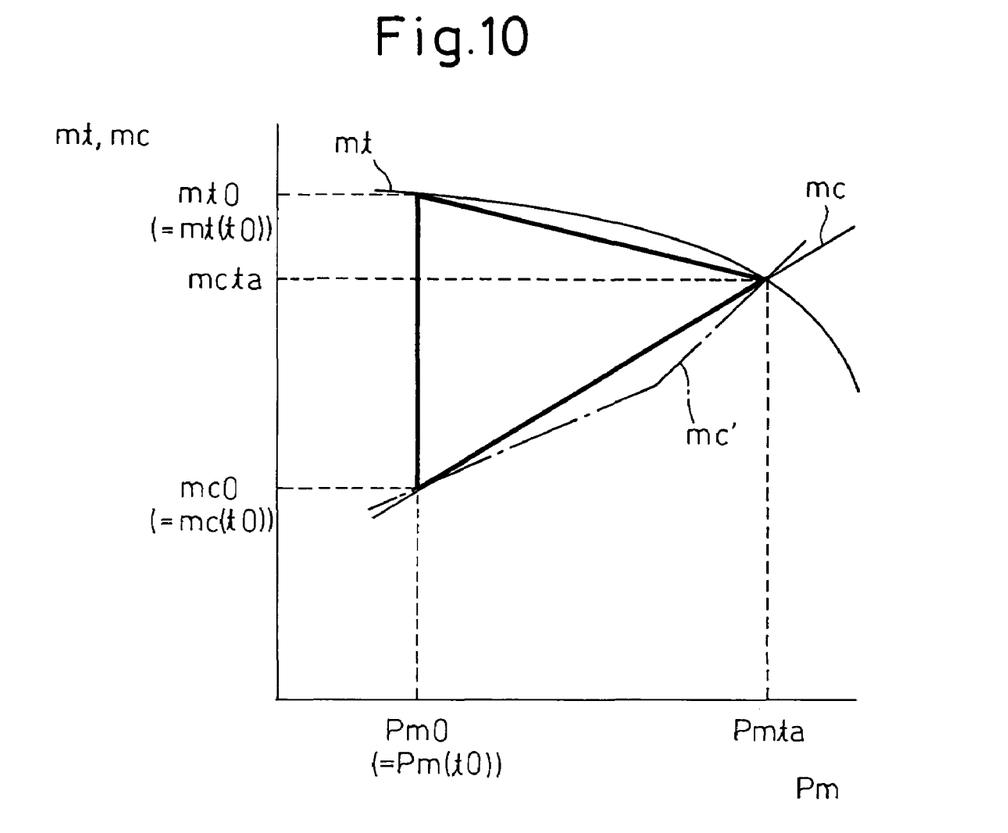
FIG. 10 is a view of another method of calculation of a response time constant $\tau$.

Further, equation (20) and equation (21) can be written as in equation (22) if considering a triangle shown in FIG. 10 similar to FIG. 9, that is, a triangle obtained by connecting the points expressing the throttle valve air passage flow rate mt and the cylinder intake air flow rate mc at the time of the current intake pipe pressure Pm0 and the point where, at the target intake pipe pressure Pmta, the throttle valve air passage flow rate mt and the cylinder intake air flow rate mc match. Here, the bottom side of the triangle is mt0–mc0 and the height of the triangle is Pmta–Pm0.

$$\tau = \frac{\text{height of triangle}}{\text{bottom side of triangle}} \cdot \frac{Vm}{R \cdot Tm} \quad (22)$$

Note that regarding the cylinder intake air flow rate mc, as explained above, the compliance parameters a and b sometimes take two different values (for example, a1, b1 and a2, b2) when the downstream side intake pipe pressure Pm is large and when it is small (this case is shown by the dot-chain line in FIG. 10). Even in such a case, it is possible to find a response time constant τ approximately by equation (20) or equation (21).

Note that in the above embodiment, as the target opening degree θtta, the required throttle opening degree θtr derived directly from the required torque TQr is used as it is, but in such a case the target opening degree θtta will fluctuate largely (hunt) with respect to a slight change in the required torque TQr. As a result, the frequency of operation of the throttle valve sometimes increases and has a detrimental effect on the durability of the throttle valve.

Figure 11:
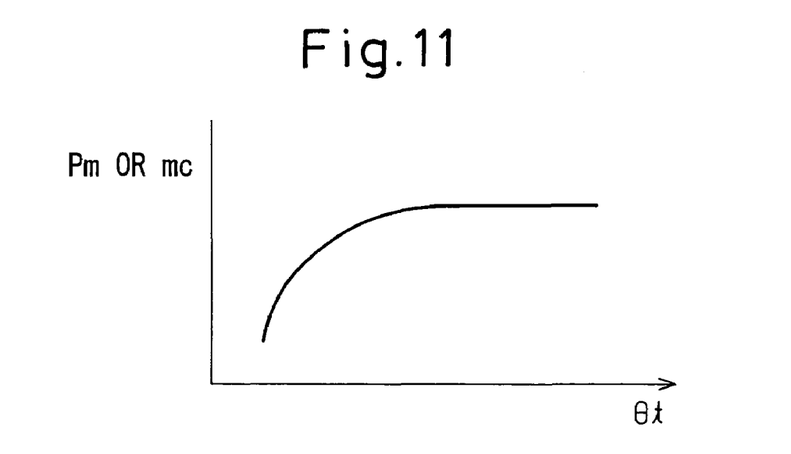
FIG. 11 is a view of the relationship between the throttle valve opening degree $\theta t$ and the downstream side intake pipe pressure Pm or cylinder intake air flow rate mc.

That is, the required throttle opening degree θtr is found as the throttle opening degree θt for making the downstream side intake pipe pressure Pm the required intake pipe pressure Pmr so as to make the cylinder intake air flow rate mc the required cylinder intake air flow rate mcr determined in according to the required torque TQr, but in general the effect of a change of the opening degree of the throttle valve on the downstream side intake pipe pressure Pm or the cylinder intake air flow rate mc etc. becomes extremely small in the region where the throttle opening degree θt is large, that is, in the region where the downstream side intake pipe pressure Pm is large (see FIG. 11). Therefore, in the region where the throttle opening degree θt is large, that is, in the region where the downstream side intake pipe pressure Pm is large, even if the required torque TQr changes slightly and the required cylinder intake air flow rate mcr etc. change slightly according to the same, it becomes necessary to change the throttle opening degree θt by a large extent in order to realize a change of the required intake pipe pressure Pmr accordingly. As a result, sometimes hunting of the throttle opening degree occurs.

Therefore, to suppress the occurrence of this problem, in another embodiment, it is possible to set the target opening degree θtta of the throttle valve by the method explained below. That is, with this method, when the required intake pipe pressure Pmr found from the required torque TQr is larger than the predetermined pressure Pmg, it is judged that the possibility of hunting arising is high and in principle a throttle opening degree different from the required throttle opening degree θtr derived directly from the required torque TQr is set as the target opening degree θtta. Below, this method will be explained in detail while referring to FIG. 12.

Figure 12:
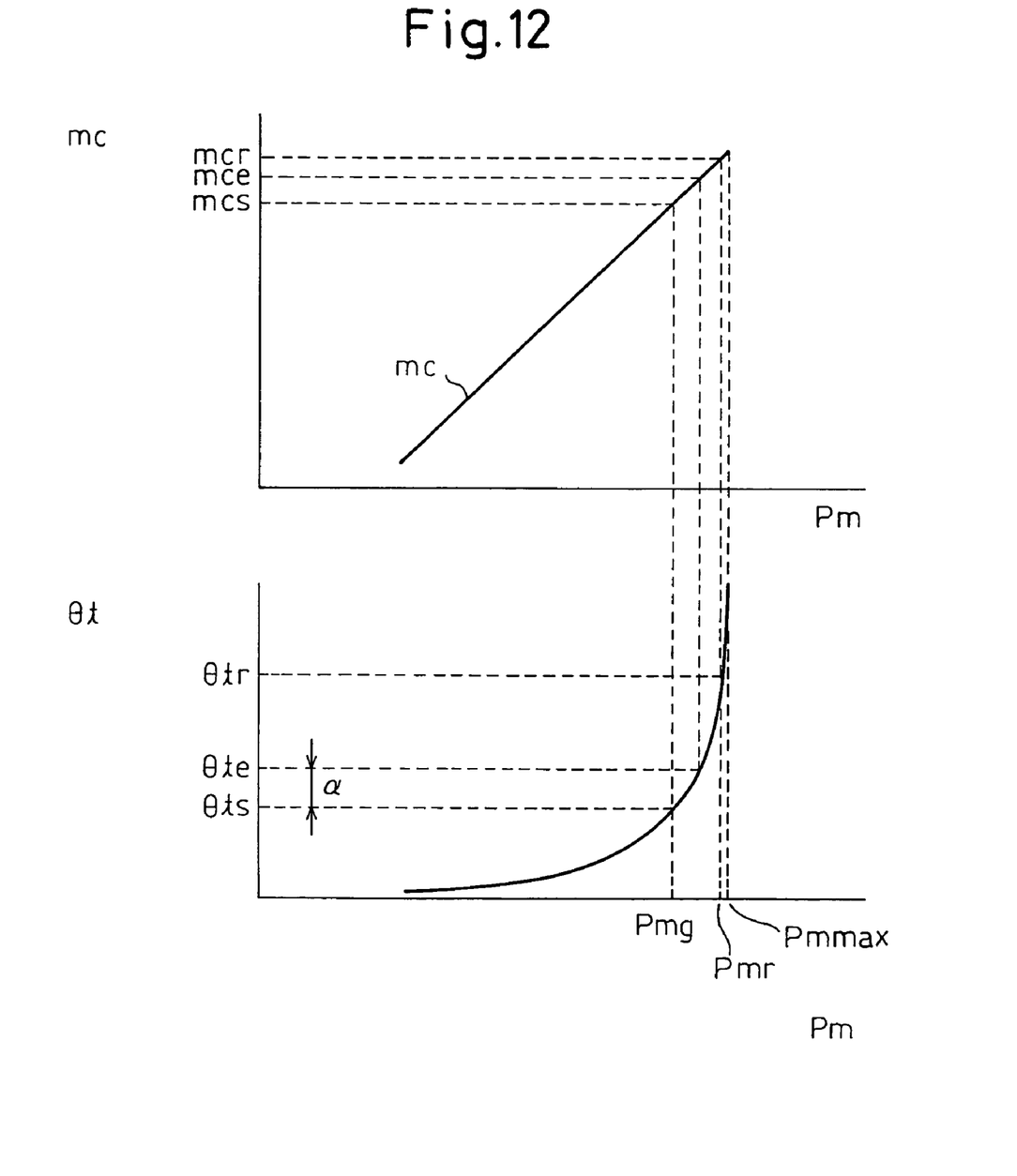
FIG. 12 is a view for explaining the method of setting the target opening degree.

FIG. 12 shows, at the top, the relationship between the downstream side intake pipe pressure Pm and the cylinder intake air flow rate mc and shows, at the bottom, the relationship between the downstream side intake pipe pressure Pm and the throttle opening degree θt. In the figure, Pmmax is the maximum value of the downstream side intake pipe pressure Pm, for example, the downstream side intake pipe pressure Pm when the throttle opening degree θt determined in accordance with the engine speed is full open. Alternatively, the atmospheric pressure Pa may be simply used. Further, Pmg is the pressure where hunting of the throttle opening degree θt may easily occur when the downstream side intake pipe pressure Pm exceeds the pressure Pmg and is determined in advance by experiments etc. This predetermined pressure Pmg may be made for example 0.95 Pmmax.

Further, in the case where the relationship between the downstream side intake pipe pressure Pm and the cylinder intake air flow rate mc and the relationship between the downstream side intake pipe pressure Pm and the throttle opening degree θt shown in FIG. 12 stand, the throttle opening degree found in accordance with the required cylinder intake air flow rate mcr derived from the required torque TQr becomes the required throttle opening degree θtr for realizing the required intake pipe pressure Pmr derived from the required torque TQr. Normally, this required throttle opening degree θtr is made the target opening degree θtta.

However, in the example shown in FIG. 12, the required intake pipe pressure Pmr becomes larger than the predetermined pressure Pmg. In this case, the required throttle opening degree θtr is made the target opening degree θtta as it is, so the possibility of hunting of the throttle opening degree θt is high. Therefore, with this method, in this case, the throttle opening degree θts corresponding to the predetermined pressure Pmg is found as the corrected target opening degree and this is set as the target opening degree θtta. In this case, the realized cylinder intake air flow rate mc becomes the mcs in FIG. 12.

Alternatively, it is also possible to set the corrected target opening degree θts found in the above way plus the correction value α, that is, the opening degree θte, as the target opening degree θtta. This correction value α is set corresponding to the tolerance of the throttle opening degree sensor 43 and the deposits on the throttle valve etc. and is determined based on at least the engine speed. By suitably setting this correction value α, it is possible to prevent the actual throttle opening area from becoming smaller due to the tolerance of the throttle opening degree sensor 43 and the deposits on the throttle valve etc. and as a result the target opening degree θtta being set excessively small. When setting the opening degree θte (=θts+α) as the target opening degree θtta, the cylinder intake air flow rate mc realized becomes mce in FIG. 12.

Note that even when the required intake pipe pressure Pmr becomes larger than the predetermined pressure Pmg, in certain cases, it is also possible to set the required throttle opening degree θtr as it is as the target opening degree θtta. That is, for example, when the generation of a large output is given priority over suppression of hunting, it is required to set the required throttle opening degree θtr as it is as the target opening degree θtta and the required cylinder intake air flow rate mcr is realized. By doing this, it is possible to realize control giving priority to operation matching the requirements more than suppressing hunting.

Further, in this case, there is the concern that a step difference will occur in the cylinder intake air flow rate mc realized due to the presence or absence of requests to set the required throttle opening degree θtr as it is as the target opening degree θtta. Therefore, in this case, as the target opening degree θtta when there is no request, it is preferable to set the throttle opening degree θte (that is, the corrected target opening degree θts plus the correction value α) rather than the throttle opening degree θts. Due to this, it is possible to suppress the occurrence of the above step differences.

Note that in the above explanation, the throttle valve air passage flow rate mt etc. were calculated using the intake pipe pressure at the upstream side of the throttle valve 18 (hereinafter referred to as the "upstream side intake pipe pressure") as the atmospheric pressure Pa but, in general, the actual upstream side intake pipe pressure becomes a pressure lower than the atmospheric pressure Pa during engine operation since there is pressure loss at the upstream side of the throttle valve in an engine intake system. In particular, in the configuration shown in FIG. 1, since an air cleaner 16 is provided at the upstream-most part of the engine intake system, in order to calculate the throttle valve air passage flow rate mt more accurately, it is preferable to consider at least the pressure loss of the air cleaner 16.

That is, at the part where the atmospheric pressure Pa is used as the upstream side intake pipe pressure in the above equations, by using the upstream side intake pipe pressure Pac found considering at least the pressure loss of the air cleaner, it is possible to calculate the throttle valve air passage flow rate mt etc. more accurately and as a result possible to find the response time constant τ more accurately.

Note that the upstream side intake pipe pressure Pac may also be detected by providing a pressure sensor directly upstream of the throttle valve 18, but it may also be calculated without using a pressure sensor. That is, the difference between the atmospheric pressure Pa and the upstream side intake pipe pressure Pac can be expressed by equation (23) by Bernoulli's theorem.

$$Pa - Pac = \frac{1}{2}\rho v^2 = k\frac{Ga^2}{\rho} \tag{23}$$

Here, ρ is the atmospheric density, v is the velocity (current) of air passing through the air cleaner 16, Ga is the flow rate of air passing through the air cleaner 16, and k is the proportional coefficient of v and Ga. If using a standard atmospheric density ρ0 and a pressure correction coefficient ekpa and the temperature correction coefficient ektha for converting the standard atmospheric density ρ0 to the current atmospheric density ρ, equation (23) can be rewritten as in equation (24). Further, equation (24) can be rewritten to equation (25) using the function f(Ga) including just the flow rate Ga as a variable.

$$Pa - Pac = \frac{k}{\rho 0} \cdot Ga^2 \cdot \frac{1}{ekpa \cdot ektha} \tag{24}$$

$$Pa - Pac = \frac{f(Ga)}{ekpa \cdot ektha} \tag{25}$$

Equation (25) can be modified as in equation (26) showing the upstream side intake pipe pressure Pac. In equation (26), the flow rate Ga can be detected by an air flow meter when an air flow meter is provided right at the downstream side of the air cleaner 16. Further, the pressure correction coefficient ekpa can be set by the detected atmospheric pressure Pa, while the temperature correction coefficient ektha can be set by the detected atmospheric temperature Ta.

$$Pac = Pa - \frac{f(Ga)}{ekpa \cdot ektha} \tag{26}$$

Further, in equation (26), the flow rate Ga of the air passing through the air cleaner 16 can be considered the throttle valve air passage flow rate mt and therefore equation (26) can be modified as in equation (27):

$$Pac = Pa - \frac{f(mt)}{ekpa \cdot ektha} \tag{27}$$

However, strictly speaking, to calculate the current upstream side intake pipe pressure Pac based on equation (27), the current throttle valve air passage flow rate mt becomes necessary. Further, conversely, to calculate the current throttle valve air passage flow rate mt using equation (2) or equation (3), etc., the current upstream side intake pipe pressure Pac becomes necessary. Therefore, to calculate the current upstream side intake pipe pressure Pac based on equation (27), it is necessary to use the previous throttle valve air passage flow rate mt, that is, the throttle valve air passage flow rate mt one discrete time before, as the throttle valve air passage flow rate mt. On this point, by repeating the calculation, it is also possible to improve the precision of the calculated upstream side intake pipe pressure Pac, but to avoid an increase in the control load, it is sufficient to calculate the equations using the upstream side intake pipe pressure Pac found based on the previously found throttle valve air passage flow rate mt as the current upstream side intake pipe pressure Pac.

While the invention has been described with reference to specific embodiments chosen for purpose of illustration, it should be apparent that numerous modifications could be made thereto by those skilled in the art without departing from the basic concept and scope of the invention.

What is claimed is:

1. A control device of an internal combustion engine calculating a response time constant of a cylinder air filling amount or its equivalent value when an opening degree of a throttle valve is changed to a target opening degree, provided with:

means for setting said target opening degree, means for finding a target intake pipe pressure as a value of convergence of an intake pipe pressure at a downstream side of the throttle valve when maintaining the opening degree of the throttle valve at said target opening degree, means for finding a current intake pipe pressure as an intake pipe pressure at a downstream side of the throttle valve when changing the opening degree of the throttle valve to said target opening degree, means for finding a throttle valve air passage flow rate, and means for finding a cylinder intake air flow rate and calculating said response time constant based on said target intake pipe pressure, said current intake pipe pressure, said throttle valve air passage flow rate, and said cylinder intake air flow rate.

2. A control device of an internal combustion engine as set forth in claim 1, wherein said response time constant is calculated using the following equation (1) where $\tau$ is said response time constant, Pmta is said target intake pipe pressure, Pm0 is said current intake pipe pressure, mt0 is a throttle valve air passage flow rate when changing the opening degree of the throttle valve to said target opening degree, mc0 is a cylinder intake air flow rate when changing the opening degree of the throttle valve to said target opening degree, Vm is a volume of an intake pipe part from the throttle valve to the intake valve, Tm0 is the intake pipe temperature at the downstream side of the throttle valve when changing the opening degree of the throttle valve to said target opening degree, and R is a gas constant:

$$\tau = \frac{Pmta - Pm0}{mt0 - mc0} \cdot \frac{Vm}{R \cdot Tm0} \quad (1)$$

3. A control device of an internal combustion engine as set forth in claim 1, wherein said means for setting the target opening degree of the throttle valve has means for finding a cylinder air filling amount corresponding to the required torque or its equivalent value and finding a required intake pipe pressure as the intake pipe pressure at the downstream side of the throttle valve for realizing this and, when said required intake pipe pressure is larger than a predetermined pressure, finding an opening degree of the throttle valve for realizing said predetermined pressure as a corrected target opening degree and setting said corrected target opening degree as said target opening degree.

4. A control device of an internal combustion engine as set forth in claim 1, wherein said means for setting the target opening degree of the throttle valve has means for finding a cylinder air filling amount corresponding to the required torque or its equivalent value and finding a required intake pipe pressure as the intake pipe pressure at the downstream side of the throttle valve for realizing this and, when said required intake pipe pressure is larger than a predetermined pressure, finding an opening degree of the throttle valve for realizing said predetermined pressure as a corrected target opening degree and setting said corrected target opening degree plus a correction value determined based on at least an engine speed as said target opening degree.

5. A control device of an internal combustion engine as set forth in claim 3 wherein, when there is a request for setting the opening degree of the throttle valve for realizing said required intake pipe pressure as said target opening degree when said required intake pipe pressure is larger than a predetermined pressure, the opening degree of the throttle valve for realizing said required intake pipe pressure is set as said target opening degree.

6. A control device of an internal combustion engine as set forth in claim 4 wherein, when there is a request for setting the opening degree of the throttle valve for realizing said required intake pipe pressure as said target opening degree when said required intake pipe pressure is larger than a predetermined pressure, the opening degree of the throttle valve for realizing said required intake pipe pressure is set as said target opening degree.

* * * * *